United States Patent [19]

Kerstan

[11] 4,243,425

[45] Jan. 6, 1981

[54] METHOD OF REFINING THE SILICATIC SLAG PHASE OBTAINED IN THE THERMAL RECOVERY OF PHOSPHORUS FROM PHOSPHATES

[75] Inventor: Walter Kerstan, Bonn, Fed. Rep. of Germany

[73] Assignee: Wessel-Werk Gesellschaft mit beschränkter Haftung, Bonn, Fed. Rep. of Germany

[21] Appl. No.: 970,824

[22] Filed: Dec. 18, 1978

[30] Foreign Application Priority Data

Dec. 20, 1977 [AT] Austria ................................. 9131/77

[51] Int. Cl.$^3$ ................................................ C04B 7/14
[52] U.S. Cl. .................................. 106/117; 106/40 R
[58] Field of Search .................. 423/322, 323; 106/63, 106/73.6, 51, 103, 117, 40 R, 40 V

[56] References Cited

U.S. PATENT DOCUMENTS

| 701,690 | 6/1902 | Engbert | 106/117 |
|---|---|---|---|
| 2,590,901 | 4/1952 | Stout et al. | 106/51 |
| 3,096,188 | 7/1963 | Maydl | 106/117 |
| 3,133,820 | 5/1964 | Powell | 106/117 |
| 3,215,542 | 11/1965 | Tinker | 106/73.6 |
| 3,582,377 | 6/1971 | Hays et al. | 106/117 |
| 3,879,214 | 4/1975 | Lowe et al. | 106/117 |

Primary Examiner—James Poer
Attorney, Agent, or Firm—Sprung, Felfe, Horn, Lynch & Kramer

[57] ABSTRACT

A method for the refining of the silicatic slag phase produced in the thermal recovery of phosphorus from phosphates, which method comprises treating the slag, in the form of finely granular solid material, with steam at a temperature between 600° C. and the softening temperature of the slag.

20 Claims, No Drawings

METHOD OF REFINING THE SILICATIC SLAG PHASE OBTAINED IN THE THERMAL RECOVERY OF PHOSPHORUS FROM PHOSPHATES

BACKGROUND

The invention relates to a method of refining the silicatic slag phase that is produced in the thermal recovery of phosphorus from raw phosphates, and the use of the refined material. The invention is especially suited for the refining of the glassy slag sand which is produced in a known manner when the molten phosphorus slag is quenched in water, and of which no really practical use has been made heretofore.

In German Auslegeschrift No. 1,804,172, a method is described for the preparation of synthetic wollastonite in which granulated glassy phosphorus furnace slag is roasted at 1000° C. to 1100° C. for one hour. The slag thus treated contains irregular crystal aggregates and has been identified as beta-wallastonite. This wollastonite is intended for use as a calcium raw material in ceramic compositions, so as to make it possible to obtain improvements in moisture expansion, expansion and contraction, and density.

The product obtained by the method of this Auslegeschrift is an opaque, gray-black material containing fine, black particles consisting in part of slagged reduction coke from the apatite reaction for the recovery of phosphorus, but also, and mainly, of black ferrophosphorus. If ceramic compositions are prepared using this material, consisting, for example, of 50% of the finely ground roasted slag and 50% clay substances, the plate produced from it will be "shadowy," i.e., it will contain dark discolorations. A perfect ceramic product cannot be produced in this manner. The described method of refining the phosphorus slag has actually never been adopted in practice to date.

In German Auslegeschrift No. 2,211,505 there is described a method for the refinement of the silicate slag phase produced in the thermal recovery of phosphorus from raw phosphate and quenched in water and granulated, in which the ferrophosphorus which granulates selectively in water is sorted out from the granular product. The sorting is accomplished especially by physical separation, for example by gravity separation with tetrabromoethane as the liquid phase. In this manner the silicatic raw slag phase from the recovery of phosphorus, which has an unsightly gray coloration, and which hitherto has been mostly dumped as a waste product or used as a cheap filler material in underground structures, is said to be converted to an improved product suitable for the preparation of wollastonite material and for the production of building materials.

In German Offenlegungsschrift No. 2,435,043 it is additionally proposed that material obtained by sorting the ferrophosphorus from the granulated silicatic slag phase be used as a raw material for glassmaking.

Extensive research into the production of synthetic wollastonite from quartz and calcium compounds by an incandescent heating process or by hydrothermal treatment followed by an incandescent heating process, is described in an article by A. Solf and W. Ohnemüller, "Darstellung von synthetischem Wollastonit aus Calciumhydrosilikaten," in Tonindustrie-Zeitung 94 (1970), No. 5, pages 197–214. The wollastonite material prepared by this method is unusable at the present time for reasons of cost.

THE INVENTION

It was the object of the invention to convert the silicatic raw slag occurring as a cheap waste material in the thermal recovery of phosphorus, and especially the glassy granulated slag produced by quenching in water, to a high-value, calcium silicate-containing material for which many different uses can be found, and to do so in a simple and improved manner in comparison with the former proposals.

The attainment of the object of the invention is based on the discovery that a hydrothermal treatment of the silicatic phosphorus raw slag in the solid phase at temperatures above 600° C. results in a surprisingly intensive refinement of the slag. In particular, it is possible in this manner to eliminate the undesired ferrophosphorus impurities. The iron is concentrated in a separate phase which is easily separated if desired, probably in the form of calcium-iron compounds. At the process temperature, gaseous reaction products such as hydrogen and hydrogen sulfide simultaneously expand the silicatic slag phase to a porous product which is susceptible of important applications.

The subject of the invention is accordingly, in a first embodiment, a method for the refinement of the silicatic slag phase which is produced in the thermal recovery of phosphorus from phosphates, which is characterized by treating the slag in the form of a finely granulated solid with steam at temperatures above 600° C. This hydrothermal treatment is performed in the temperature range below the softening temperature of the finely granular material being treated. Particularly suitable is the temperature range up to approximately 1,000° C., preferably from about 650° to 1000° C., and especially the range from about 750° to 900° C.

In the method of the invention, it is preferred to use the granular raw slag which is produced, for example, by quenching and simultaneous granulation in water of the silicatic slag phase obtained from the reductive recovery of phosphorus. It may be desirable first to free this granulated raw slag of coarse impurities by sifting, these impurities consisting as a rule of coke infiltrated with phosphorus slag. If desired, the granular raw slag used as starting material can first be treated by sifting, the material which will pass through a sieve with mesh openings of approximately 5 mm, or preferably of about 2 mm, being used in the method of the invention.

In the method of the invention, it is desirable to set the finely granular raw slag in movement at the process temperature, for example by stirring it, and at the same time treating it with flowing steam, this treatment being continued until the undesirable impurities, especially the ferrophosphorus, are eliminated. A rotary kiln heated to the process temperature and fed with steam is appropriate for treating the granular material by the method of the invention. The input material can also be introduced in the wet state. The duration of the treatment can range from a few minutes to a few hours—for example from, say, 15 minutes to five hours—and it amounts, as a rule, to about 20 minutes to one and one-half hours. Another possibility is the treatment of the granulated slag in a shaft furnace through which steam flows upwardly, the granulated slag being fed in at the top and falling downward, with deflection by baffles, against the flow of the steam.

The slag refined in the method of the invention is obtained in the form of a porous, expanded product having a lesser density than the starting material. The density of the process product can be affected especially through the selection of the operating temperature. The rule is that the higher the process temperature is, the lower the bulk density will be—i.e., the more highly expanded the product will be—under otherwise identical process conditions. In accordance with the invention, it is possible to establish bulk densities in the process product of less than one, preferably of less than 0.7. If the process is performed at sufficiently high temperatures, above 800° C., for example, bulk densities or weights even below 0.5 can be established. The process is commonly performed in the standard pressure range.

The process of the invention results in a decoloration of the raw slag. The silicate-rich material is yielded as a frit-like expanded substance in which nonmagnetic, dark grains of dense structure are found. These dark impurities can easily be separated from the refined slag product, if desired. This can be accomplished by a physical method. For example, the expanded silicatic, frit-like material can be broken up much more easily than the dark, granular impurities, so that the unbroken granular impurities can be separated by a sifting process. Amazingly, however, it has been found that, for example for the preparation of high-quality ceramic compositions, such separation of these impurities which are present after the refining procedure of the invention is not even necessary.

Suitable silicatic raw slags are the slags produced from raw phosphates, especially fluorapatite, used in commercial processes for the recovery of phosphorus. In particular, they can be silicate slags which have been freed of most of the ferrophosphorus formed as a second molten phase, but which still contain considerable amounts of ferrophosphorus. Information on the composition of such raw slag starting materials are to be found, for example, in the above-cited German Auslegeschrift Nos. 1,804,172 and 2,211,505. The special composition varies within relatively narrow limits according to the raw material used for the recovery of phosphate. For example, phosphorus oven slags having the following chemical composition can be suitable:

$SiO_2$—44 to 48 wt.-%
$CaO$—42 to 46 wt.-%
$Al_2O_3$—2 to 5 wt.-%
$Na_2O/K_2O$—1 to 3 wt.-%
$F_2$—1 to 3 wt.-%.

A raw slag especially suitable as starting material for the process of the invention can have the following chemical composition:

$SiO_2$—42 to 49 wt.-%
$Al_2O_2$—0.7 to 5 wt.-%, especially 0.7 to 3 wt.-%
$Fe_2O_3$—0.1 to 0.3 wt.-%
$TiO_2$—0 to 1 wt.-%,
$Na_2O$—0.4 to 0.6 wt.-%
$K_2O$—0.2 to 0.3 wt.-%
$CaO$—42.0 to 48 wt.-%
$MgO$—0.2 to 0.3 wt.-%
$F$—1 to 3.5 wt.-%, especially 2.5 to 3 wt.
$S$—0.2 to 0.4 wt.-%
$P_2O_5$—1.0 to 1.5 wt.-%

These are the analysis values of the roasted material after undergoing a weight loss of 3 to 8% in the roasting.

If such a raw slag, which, in the practical process has not, of course, been roasted beforehand, is treated in the finely divided state with steam at temperatures above 600° C., but below the temperatures at which any substantial cementing together of the solid particles takes place, the result will be a porous, granulated product in which wollastonite and cuspidin ($Ca_2Fe_2Si_2O_7$) can be detected.

The analysis of the black impurities before and after the treatment in accordance with the invention is performed is very revealing.

When the impurities were isolated from the raw slag before treatment in accordance with the invention, the following analysis was obtained:

Roasting loss at 1000° C.—32.9 wt.-%
$SiO_2$—28.0 wt.-%
$CaO$—25.4 wt.-%
$Fe_2O_3$—2.9 wt.-%
$FeP$ and $Fe_2P$—1.1 wt.-%

This substance is a coke infiltrated by phosphorus slag. By the steam treatment of the invention at 850° C., for example, a white, expanded product is produced, in which nonmagnetic, black grains of dense structure are found. The analysis of this impurity yielded the following values:

No roasting loss, but a weight increase of 8.1 wt.-%
$CaO$—23.9 wt.-%
$Fe_2O_3$—36.2 wt.-%

If the black grains are crushed, for example to a particle size of 60 microns, the powder is a dark reddish brown. Under the influence of the process of the invention, the iron-phosphorus compounds have evidently decomposed, and then the iron has possibly reacted with calcium to produce calcium ferrites.

In one embodiment of the invention, it is possible during the above-described hydrothermal transformation of the phosphorus slag granules to add coloring adjuvants, especially metal oxides or their salts. The mixture of substances is then subjected to the described hydrothermal calcination. In this case, colored, expanded, porous products are formed. Appropriate colorant metal oxides and their salts are, for example, those of iron, chromium, manganese, nickel or cobalt. Amounts of 0.5 to 5 wt.-% with respect to the granulated phosphorus slag are appropriate.

The calcium silicate-base materials prepared by the method of the invention are high-quality starting materials for applications in which calcium raw materials of this kind are needed. Examples of such applications are to be found in ceramic compositions, glazes, enamels, and glasses and glass melts in general. In the use of the phosphorus slag treated with steam in accordance with the invention, a white ceramic body is formed. Due to the crystalline structure of the wollastonite that is formed, high energies of activation are not necessary in the body forming process. The firing of such ceramic compositions can be performed, for example, at 950° C. The desirable properties of wollastonitic compositions described in the literature are found in the wollastonite produced by the method of the invention from phosphorus slag.

Just as glazes, enamels and glasses can be made with natural wollastonite, it is possible also to make them with the wollastonite obtained from phosphorus slag by the method of the invention. The advantages of wollastonitic glazes are described, for example, by W. Lehnhäuser and J. Jäger in "Wollastonit in Glasuren," Sprechsaal 93 (1960), No. 1, pages 1 and 2.

Use can be made of the possibility described above, in accordance with the invention, for removing the dark colored granular impurities from the expanded material of the invention before its use, especially for the production of white glazes and glasses.

On account of its specific physical nature, the product of the method of the invention can also be used to advantage in other fields of application. Examples are especially the manufacture of building materials in which the expanded, porous structure of the products made in accordance with the invention can be used to advantage. Thus it is possible to transform phosphorus slag, which formerly was considered to be a virtually worthless waste material, to high-quality construction adjuvants. For example, a wollastonitic material of a bulk weight of about 0.35 to 0.45 grams per cubic centimeter obtained by the invention is an excellent insulating material which can be used at temperatures up to 1,050° C. As a thermal insulating composition, it is suitable, in contrast to organic materials, as an industrial furnace insulating material. It can be combined with appropriate binders to serve as a light construction material or additive for walls, slabs, bricks and the like.

Another field of applications for the products of the method of the invention is in agriculture and gardening. Foamed plastics, plain or charged with fertilizer, have been introduced already as soil loosening agents. The product obtained by the invention can be used successfully in this application. In comparison with the known foamed materials based on plastics, the advantage of the material used in accordance with the invention lies in better wetting by the soil, which tends to prevent the material from being blown away by the wind when used on dry soils.

The expanded calcium silicate material of the invention can be used as is or charged with fertilizers. At the same time, a certain inherent fertilizing action is to be attributed to the wollastonite prepared in accordance with the invention. It supplies especially calcium in limited amounts.

EXAMPLES

EXAMPLE 1

Granulated raw phosphorus slag from the thermal recovery of phosphorus is sifted through a screen of a mesh opening size of 2 millimeters. The sifted material has a bulk density of 123 grams per 100 milliliters. The material has a grayish-black appearance.

Two experiments are performed at each of three process temperatures of 650° C., 750° C. and 880° C., one of the experiments without the addition of steam, and the other with the injection of steam in accordance with the invention. The experiments are performed in an externally heated rotary kiln. The time which the sample of material (77 g) takes to pass through the kiln is 17 minutes. The kiln is rotated at a rate of 12 revolutions per minute. The amount of water used in each of the experiments in accordance with the invention is 20 grams. In the following table are given the bulk densities of the process products obtained, and the appearance of same.

TABLE

| Experiment No. | Temp. °C. | Water evaporated in grams | Bulk density in grams per 100 milliliters | Appearance |
| --- | --- | --- | --- | --- |
| 1 | 650 | — | 118.— | grayish black as originally supplied. |
| 2 | 650 | 20.— | 114.— | grayish black interspersed with white particles |
| 3 | 750 | — | 121.— | compacted, fritting started on surface, grayish white |
| 4 | 750 | 20.— | 79.— | expanded (odor of hydrogen sulfide) grayish white color |
| 5 | 880 | — | 78.— | slightly expanded, grayish white color |
| 6 | 880 | 20.— | 34.— | white, greatly expanded, particles can easily be crumbled. |

EXAMPLE 2

The following wall tile composition was prepared:
50% of the phosphorus slag treated in accordance with the invention,
10% plastic clay ($Al_2O_3$: 32%) specific surface area 46.0 square meters per gram
40% quartz-rich clay ($Al_2O_3$: 13%) specific surface area 13.0 square meters per gram.

The components were ground wet, dried, and again crushed and moistened with 7.5% water. The tile pressed and fired at 950° C. has the characteristics given in the following table.

For comparison, a wall tile composition in common use at the present time is listed beside it:

| | Experimental composition No. 1723/950° C. | Conventional wall tile composition, 1140° C. |
| --- | --- | --- |
| Shrinkage | 0.5% | 0.5% |
| Water absorption (24 h) | 18.9% | 13.4% |
| Softening point under load | 1140° C. | approx. 1280° C. |
| Moisture expansion (factor 3 swelling) (3 atmospheres gauge pressure for one hour) | 0.015% | 0.02% |

| | Experimental composition No. 1723/950° C. | | Conventional wall tile composition, 1140° C. |
| --- | --- | --- | --- |
| Ak. Grd.$^{-1}$ | | | |
| 20–220° C. | 69.2 | $10^{-7}$ | |
| 20–400° C. | 72.1 | $10^{-7}$ | approx. 82–85 $10^{-7}$ |
| 20–580° C. | 82.9 | $10^{-7}$ | |

EXAMPLE 3

20 grams of expanded wollastonite in accordance with the invention were let stand at room temperature for one week in 100 ml of water from the Bonn city waterworks. After allowing for the calcium content of the water, 0.78 milligrams of $Ca^{2+}$ had been dissolved per liter of water. This indicates the feasibility of using the material of the invention in gardening and farming.

It will be understood that the specification and examples are illustrative but not limitative of the present invention and that other embodiments within the spirit and scope of the invention will suggest themselves to those skilled in the art.

What is claimed is:

1. Method for the refining of the silicatic slag phase produced in the thermal recovery of phosphorus from phosphates, which method comprises treating the slag, in the form of finely granular solid material, with steam at a temperature between 600° C. and the softening temperature of the slag.

2. Method as claimed in claim 1 wherein said treatment is carried out at a temperature from 650° to 1000° C.

3. Method as claimed in claim 2 wherein the treatment is carried out at a temperature of from 750° to 900° C.

4. Method as claimed in claim 1 wherein the slag is transformed to an expanded product having a bulk density of less than 1.

5. Method as claimed in claim 4 wherein the expanded product has a bulk density of less than 0.7.

6. Method as claimed in claim 4 wherein the expanded product has a bulk density of less than 0.5.

7. Method as claimed in claim 1 wherein the raw slag in the form of finely granular solid material is simultaneously stirred and treated with flowing steam.

8. Method as claimed in claim 7 wherein the stirring and steam treatment is performed in a rotary kiln or shaft furnace through which the steam flows.

9. Method as claimed in claim 1 wherein said treatment is continued until the ferrophosphorus present in the raw slag is substantially completely converted.

10. Method as claimed in claim 1 wherein the steam-treated slag is subjected to physical cleaning to remove dark colored, granular impurities.

11. Method as claimed in claim 1 wherein coloring adjuvants are added to the phosphorus slag.

12. Ceramic composition comprising silicatic phosphorus furnace slag refined as claimed in claim 1.

13. Building material composition comprising silicatic phosphorus furnace slag refined as claimed in claim 1.

14. Method as claimed in claim 1 wherein said slag, in the form of finely granular solid material, is formed by quenching in water.

15. Method as claimed in claim 1 wherein the slag phase comprises iron phosphides.

16. Method as claimed in claim 15 wherein the steam is applied for a time sufficient to convert the iron of the iron phosphides into trivalent iron.

17. Method as claimed in claim 15 wherein the steam is applied for a time sufficient to substantially form nonmagnetic dark grains of dense structure.

18. Method as claimed in claim 1 wherein the slag chemical composition comprises 42–49 weight percent $SiO_2$ and 42–48 weight percent CaO.

19. Method as claimed in claim 1 wherein the steam treatment ranges from fifteen minutes to five hours.

20. Method as claimed in claim 15 wherein iron phosphorus compounds are present in the slag and comprising decomposing the iron phosphorus components in the presence of the steam.

* * * * *